(12) United States Patent
Simpson

(10) Patent No.: US 9,932,720 B2
(45) Date of Patent: Apr. 3, 2018

(54) EXCAVATOR SHEARING IMPLEMENT

(71) Applicant: Robert W. Simpson, Keen Mountain, VA (US)

(72) Inventor: Robert W. Simpson, Keen Mountain, VA (US)

( * ) Notice: Subject to any disclaimer, the term of this patent is extended or adjusted under 35 U.S.C. 154(b) by 0 days.

(21) Appl. No.: 15/210,971

(22) Filed: Jul. 15, 2016

(65) Prior Publication Data
US 2017/0022684 A1    Jan. 26, 2017

Related U.S. Application Data

(60) Provisional application No. 62/231,958, filed on Jul. 20, 2015.

(51) Int. Cl.
| E02F 3/40 | (2006.01) |
| B23D 31/00 | (2006.01) |
| E02F 3/42 | (2006.01) |
| E02F 3/96 | (2006.01) |
| E02F 5/30 | (2006.01) |
| B23D 17/06 | (2006.01) |
| B23D 33/00 | (2006.01) |
| A01G 3/08 | (2006.01) |

(52) U.S. Cl.
CPC ............... *E02F 3/962* (2013.01); *A01G 3/08* (2013.01); *B23D 17/06* (2013.01); *B23D 33/00* (2013.01); *E02F 3/404* (2013.01); *E02F 3/425* (2013.01)

(58) Field of Classification Search
CPC .................................................. A01G 23/093
See application file for complete search history.

(56) References Cited

U.S. PATENT DOCUMENTS

| 2,332,561 | A | * | 10/1943 | Drott | ..................... | E02F 3/4133 |
| | | | | | | 144/34.5 |
| 3,196,911 | A | | 7/1965 | Busch et al. | | |
| 4,355,476 | A | * | 10/1982 | Engkvist | ................ | E02F 3/404 |
| | | | | | | 37/406 |
| 4,536,976 | A | | 8/1985 | Holopainen | | |
| 4,541,177 | A | | 9/1985 | Hollander | | |
| 4,908,946 | A | * | 3/1990 | Labounty | ............. | A01G 23/087 |
| | | | | | | 144/339 |
| 5,678,332 | A | | 10/1997 | Hawkins | | |
| 6,088,938 | A | | 7/2000 | Logan | | |
| 6,203,267 | B1 | * | 3/2001 | Heiple | .................... | E02F 3/404 |
| | | | | | | 37/403 |
| 6,209,237 | B1 | * | 4/2001 | Heiple | .................... | E02F 3/404 |
| | | | | | | 37/406 |
| 6,843,005 | B2 | * | 1/2005 | Clapper | ................. | E02F 3/404 |
| | | | | | | 37/406 |
| 7,526,885 | B2 | | 5/2009 | Peterson et al. | | |
| 7,938,153 | B1 | | 5/2011 | Gregory, Jr. | | |
| 8,931,527 | B2 | | 1/2015 | Raymond | | |

(Continued)

*Primary Examiner* — Tara Mayo-Pinnock
(74) *Attorney, Agent, or Firm* — Hunton & Williams LLP

(57) ABSTRACT

A shearing implement for use with an excavator has a thumb having a grasping side and a cutting side and being pivotably attachable to the boom. A shearing blade member is pivotably attached to the cutting side of the thumb. A linear actuator has a first end attached to the shearing blade member and a second end attachable to the boom or the thumb so that extension and retraction of the linear actuator causes the shearing blade member to rotate relative to the thumb.

19 Claims, 13 Drawing Sheets

(56) References Cited

U.S. PATENT DOCUMENTS

2006/0283056 A1* 12/2006 Risch .................. E02F 3/404
                                                    37/466
2007/0130808 A1*  6/2007 Peterson ............. E02F 3/404
                                                    37/406
2010/0058622 A1   3/2010 Calvert et al.

* cited by examiner

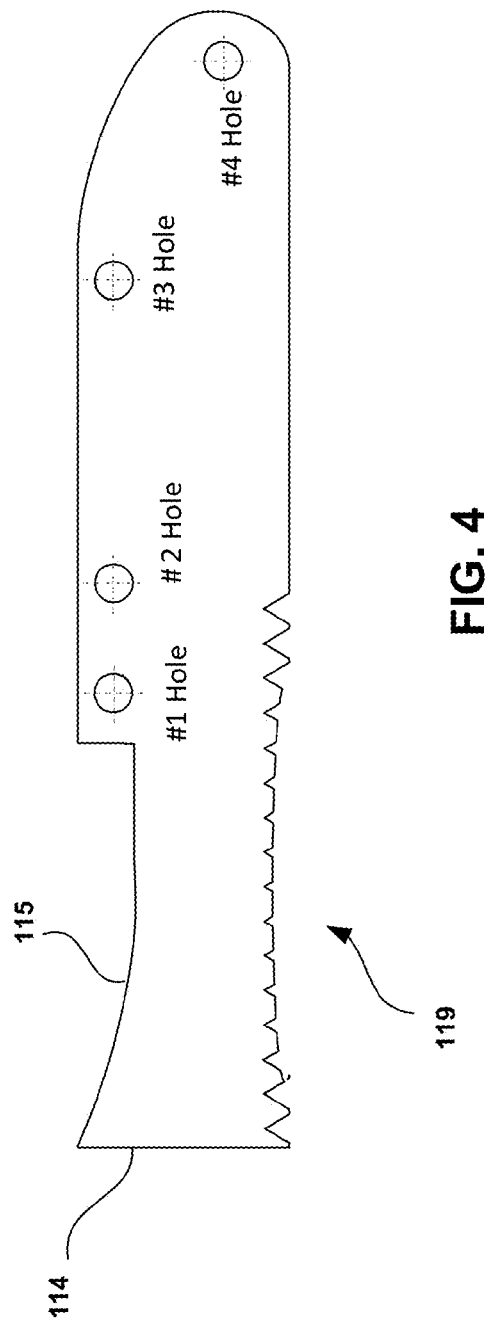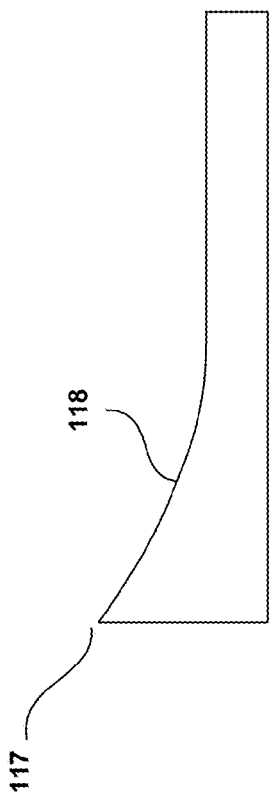
FIG. 4
FIG. 5

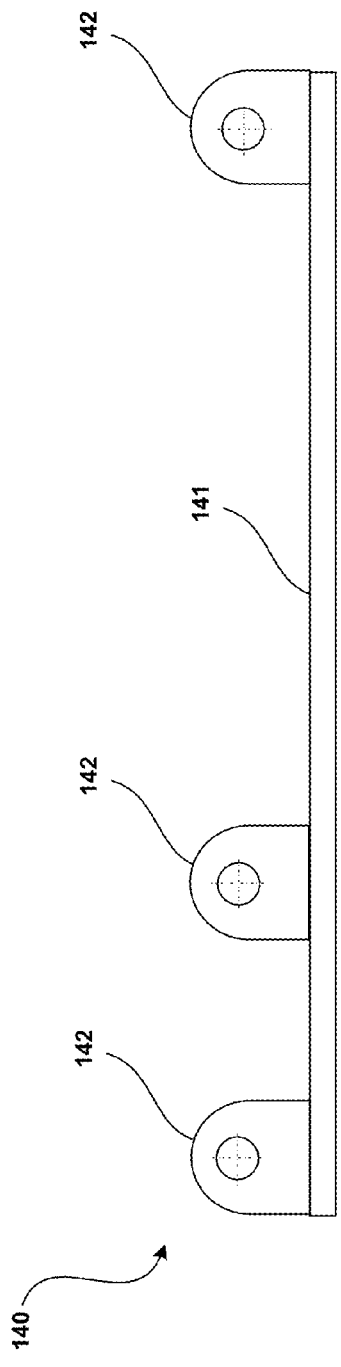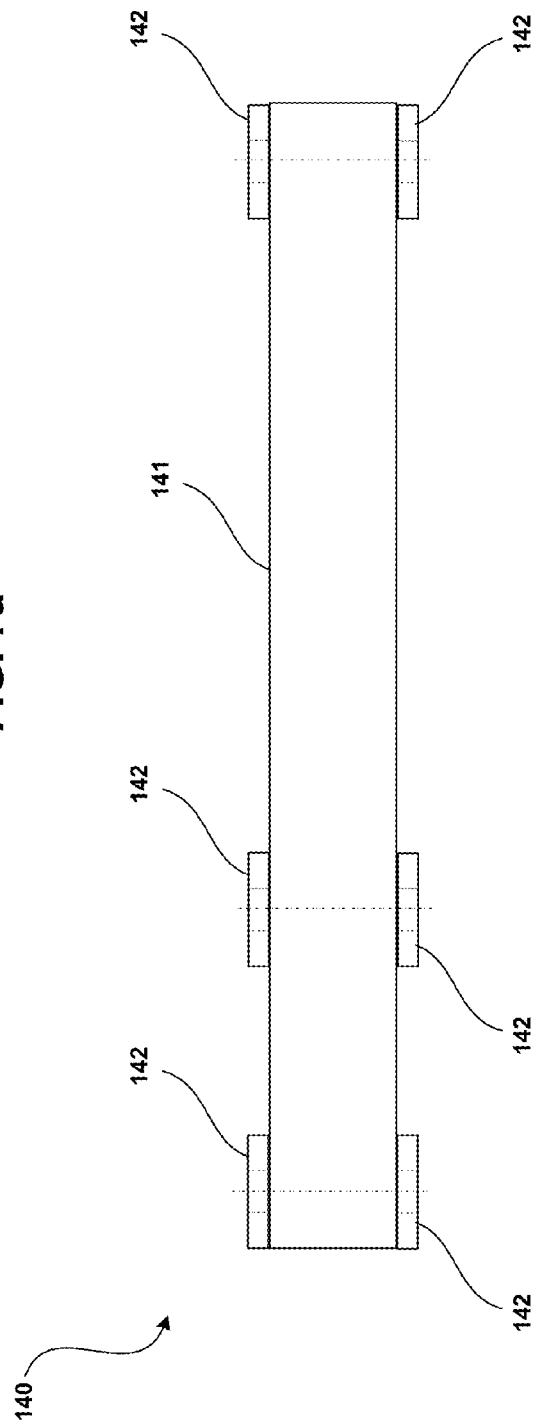
Side View
FIG. 7a
Top View
FIG. 7b

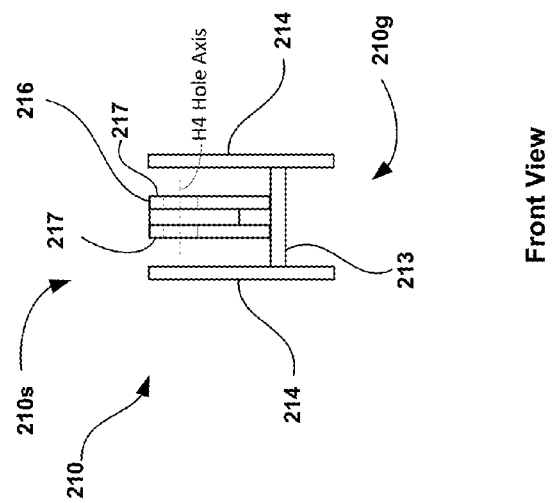
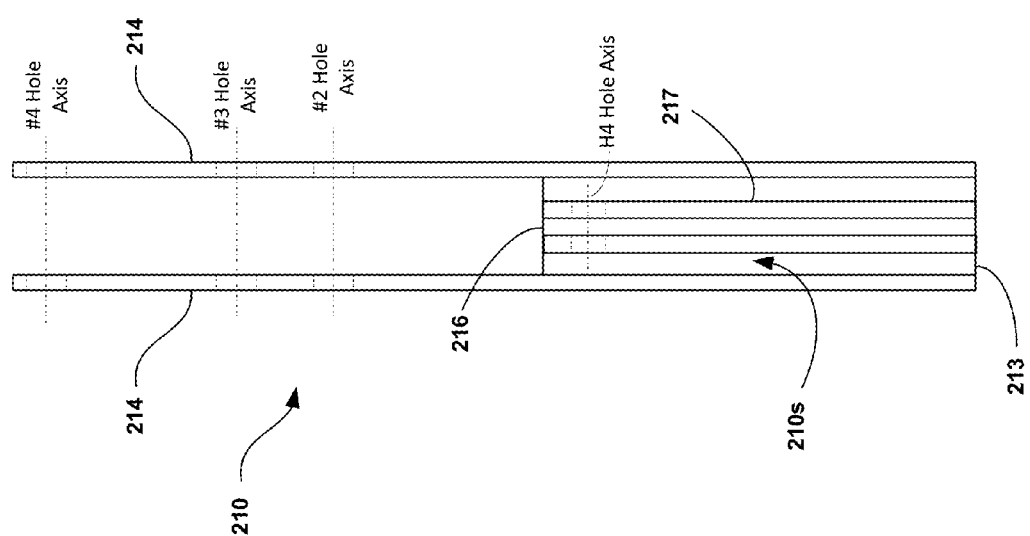

EXCAVATOR SHEARING IMPLEMENT

REFERENCE TO RELATED APPLICATION

This application claims priority to U.S. Provisional Patent Application 62/231,958, filed on Jul. 20, 2015, the complete disclosure of which is incorporated herein by reference.

BACKGROUND OF THE INVENTION

The present invention relates generally to operative attachments for excavators and other equipment and, more specifically, to a shearing implement for use in conjunction with the bucket of a conventional excavator.

Excavators, including back hoes and other similar equipment, typically comprise a hydraulically operated boom with a bucket configured for digging holes or trenches. FIG. 1 illustrates a conventional excavator 10 that has a jointed boom 11 whose components are movable by hydraulic cylinders 12, 13. A bucket 14 pivotably attached to the end of the boom 11 can be selectively rotated by bucket cylinder 15. Cooperative movement and rotation of the boom 11 and the bucket 14 are used by the operator for digging or moving earth or other materials. These components can be converted to a grasping tool by the addition of a pivotable thumb 32 attached to the boom 11. As shown in FIG. 1, the thumb 32 may have the same attachment/pivot point as the bucket 14. The thumb 32 may be selectively rotatable by a thumb cylinder 34. The bucket 14 and the thumb 34 may be used in cooperation to grasp a target object 5 by rotating one or both towards one another.

SUMMARY OF THE INVENTION

An illustrative aspect of the invention provides a shearing implement for use with an excavator having a bucket pivotably attached to a bucket end of a boom. The shearing implement comprises a thumb having a base with grasping and blade receiving surfaces on opposite sides of the base and proximal and distal base ends. The thumb also has a pair of elongate thumb wall members. Each thumb wall member is attached to the base and extends proximally from the proximal base end. The thumb wall members have proximal wall end portions attachable to the boom so as to be pivotable relative to the boom at a thumb pivot at or adjacent the bucket end. The shearing implement further comprises a shearing blade member having a proximal attachment portion with a proximal blade member end and a distal blade portion with a distal blade member end. The shearing blade member is pivotably attached to the thumb at a blade pivot axis that is spaced apart from both the proximal and distal blade member ends and both the proximal wall end and the distal base end. The blade portion has a cutting edge distal to the blade pivot axis and the shearing blade member is configured to pivot between a closed position in which the cutting edge engages the blade receiving surface of the thumb base and an open position in which the cutting edge is rotationally spaced apart from the blade receiving surface of the thumb base. The shearing implement also comprises a first linear actuator having a first end attached to the shearing blade member and a second end attachable to one of the set consisting of the boom and the thumb, so that extension and retraction of the linear actuator causes the shearing blade member to rotate about the blade pivot axis.

Another illustrative aspect of the invention provides a shearing implement place of a grasping thumb of an excavator having a bucket pivotably attached to a bucket end of a boom and an actuator attached at a first end to the boom and attachable at a second end to the grasping thumb. The actuator is operable to selectively rotate the grasping thumb between a non-grasping configuration and a grasping configuration in which the thumb engages a portion of the bucket. The shearing implement comprises a replacement thumb having a base with grasping and blade receiving surfaces on opposite sides of the base and proximal and distal base ends. The replacement thumb also has a pair of elongate thumb wall members. Each thumb wall member is attached to the base and extends proximally from the proximal base end. The thumb wall members have proximal wall end portions attachable to the boom so as to be pivotable relative to the boom at a thumb pivot at or adjacent the bucket end. The shearing implement further comprises a shearing blade member having a proximal attachment portion with a proximal blade member end and a distal blade portion with a distal blade member end. The shearing blade member is pivotably attached to the thumb by a blade pivot that is spaced apart from both the proximal and distal blade member ends and both the proximal wall end and the distal base end. The blade portion has a cutting edge distal to the blade pivot and the shearing blade member is configured to pivot between a closed position in which the cutting edge engages the blade receiving surface of the thumb base and an open position in which the cutting edge is rotationally spaced apart from the blade receiving surface of the thumb base.

Another illustrative aspect of the invention provides a method for using a shearing implement with an excavator having a bucket pivotably attached to a bucket end of a boom. The method comprises providing a shearing implement having a thumb having a base with grasping and blade receiving surfaces on opposite sides of the base and a pair of elongate thumb wall members extending proximally from the base to proximal thumb wall ends. The shearing implement also has a shearing blade member pivotably attached to the thumb, and the shearing blade member has a blade portion with a cutting edge and is configured to pivot between a closed blade position in which the cutting edge engages the blade receiving surface of the thumb base and an open blade position in which the cutting edge is rotationally spaced apart from the blade receiving surface of the thumb base. The shearing blade member is lockable in the closed position. The shearing implement also has a linear actuator having a first end attached to the shearing blade member and a second end. The method further comprises pivotably attaching the proximal thumb wall ends to the boom at a first attachment location. The first attachment location is selected so that the thumb can be rotated between a closed thumb position in which the grasping surface of the thumb engages a grasping portion of the bucket and an open thumb position in which the grasping surface is rotationally spaced apart from the grasping portion of the bucket. The method further comprises attaching the second end of the actuator to the boom at a second attachment point spaced apart from the first attachment point. The method, also comprises placing the shearing implement in a grasping configuration by locking the shearing blade member in the closed blade position and placing the shearing implement in a shearing configuration by unlocking the shearing blade member and attaching a first end of a stabilizer bar to the thumb and a second end of the stabilizer bar to the boom at a third attachment point intermediate the first and second attachment points.

BRIEF DESCRIPTION OF THE DRAWINGS

The invention can be more fully understood by reading the following detailed description together with the accompanying drawings, in which like reference indicators are used to designate like elements, and in which:

FIG. 4 is a side view of a thumb wall member of the thumb of FIGS. 3a and 3b.

FIG. 5 is a side view of a blade receiver side of the thumb of FIGS. 3a and 3b.

FIGS. 7a and 7b are side and top views of a boom bracket usable in a shearing implement according to an embodiment of the invention.

FIGS. 11a and 11b are top and front views of a thumb usable in a shearing implement according to an embodiment of the invention.

DETAILED DESCRIPTION OF THE INVENTION

Reference will be made in detail to exemplary embodiments, examples of which are illustrated in the accompanying drawings. It should be appreciated that the same reference numbers will be used throughout the drawings to refer to the same or like parts. The following description is intended to convey a thorough understanding of the embodiments described by providing a number of specific embodiments. It should also be appreciated that the following detailed descriptions are exemplary and explanatory only and are not restrictive.

The present invention provides a shearing implement that provides users the ability to grasp target objects between an excavator bucket and the thumb attachment, and also to cut items, such as shrubs, branches, and the like, utilizing a single linear actuator such as a hydraulic cylinder.

The shearing implements of the invention may be attached or attachable to the end of a conventional excavator boom. In typical embodiments of the invention, the shearing implement uses the back side of a modified excavator thumb as the receiving base for a hydraulically operated blade. The apparatus is configured so that the operator can maneuver the excavator boom to position a target object between the blade and the thumb. A hydraulic actuator then causes the blade to close against the receiving surface of the thumb, thereby cutting the target object. As will be described in more detail, the device may be configured with straightforward linkage that allows easy conversion from a grasping mode to a cutting mode.

Figure 1:
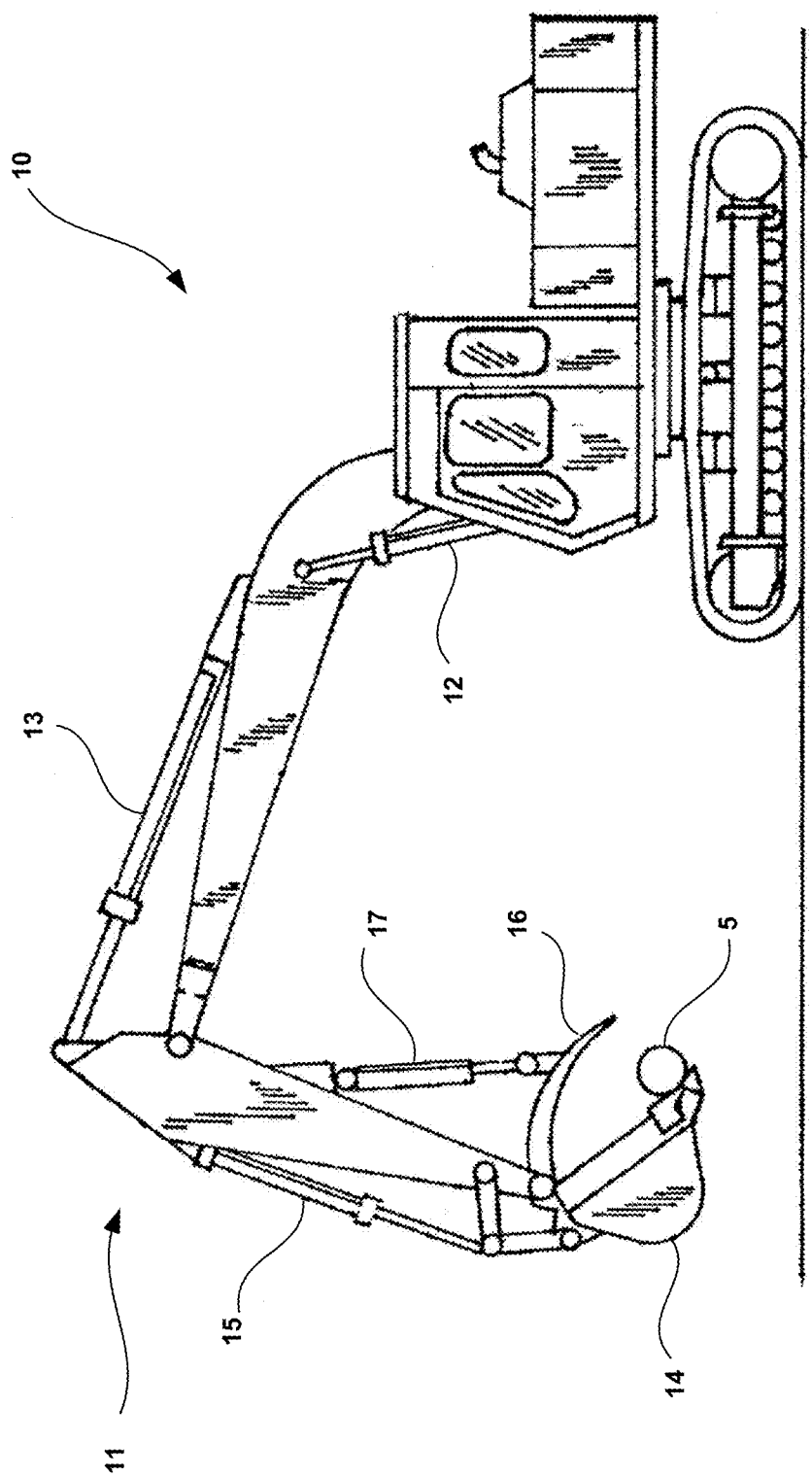
FIG. 1 is a representative image of a prior art excavator with a boom, bucket, and thumb attachment.

The cutting implements of the invention are a modification of the widely used hydraulic thumb attachment used on excavators. As used herein, the term "excavator" means any digging or grasping machine having a bucket mounted at the end of a boom, including, without limitation, tracked excavators, track hoes, tractors and back-hoe equipment. The implements of the invention were developed to be used as hydraulic thumbs and/or shear-cutter devices using the same hydraulic system and components as a hydraulic thumb such as the thumb 16 shown in FIG. 1. A unique feature of the invention is that, in some embodiments, the device can be switched from a hydraulic thumb to a hydraulic shearing-cutting device in seconds by simply locking the shearing blade member in place. This has the effect of shifting the pivot point of the device, which changes the hydraulic force from the thumb to the shear cutting device. The machine's bucket stays in place and is totally operational while using the device. While the device is in its shear-cutter configuration, the thumb section can still be utilized as a stationary thumb and the bucket and its hydraulic system can be used as a clamping mechanism for the stationary thumb.

The hydraulic force of the shear-cutting blade provides a powerful cutting device that can be set to cut trees, shrubs, trim tree limbs, grapevines, wire, fencing, thin metal and even medium size trees. The device can be sized for any equipment and the amount of force applied to the cutting device will be determined by the size and hydraulic system of that equipment. For example, the shear-cutter's force will typically increase in proportion to the size of the hydraulic cylinder and the hydraulic pressure applied to that cylinder.

In typical embodiments, the implements of the invention may be configured to cut in a straight forward, longitudinal direction (i.e., in the plane of the boom to which it is attached). In some embodiments, however, the implement may be configured to be selectively rotated out of that plane so that it can cut at a 45 or 90 degree (or other) angle. This may be accomplished, for example, by rotating the device within a pipe system attached and designed for this purpose.

Figure 2:
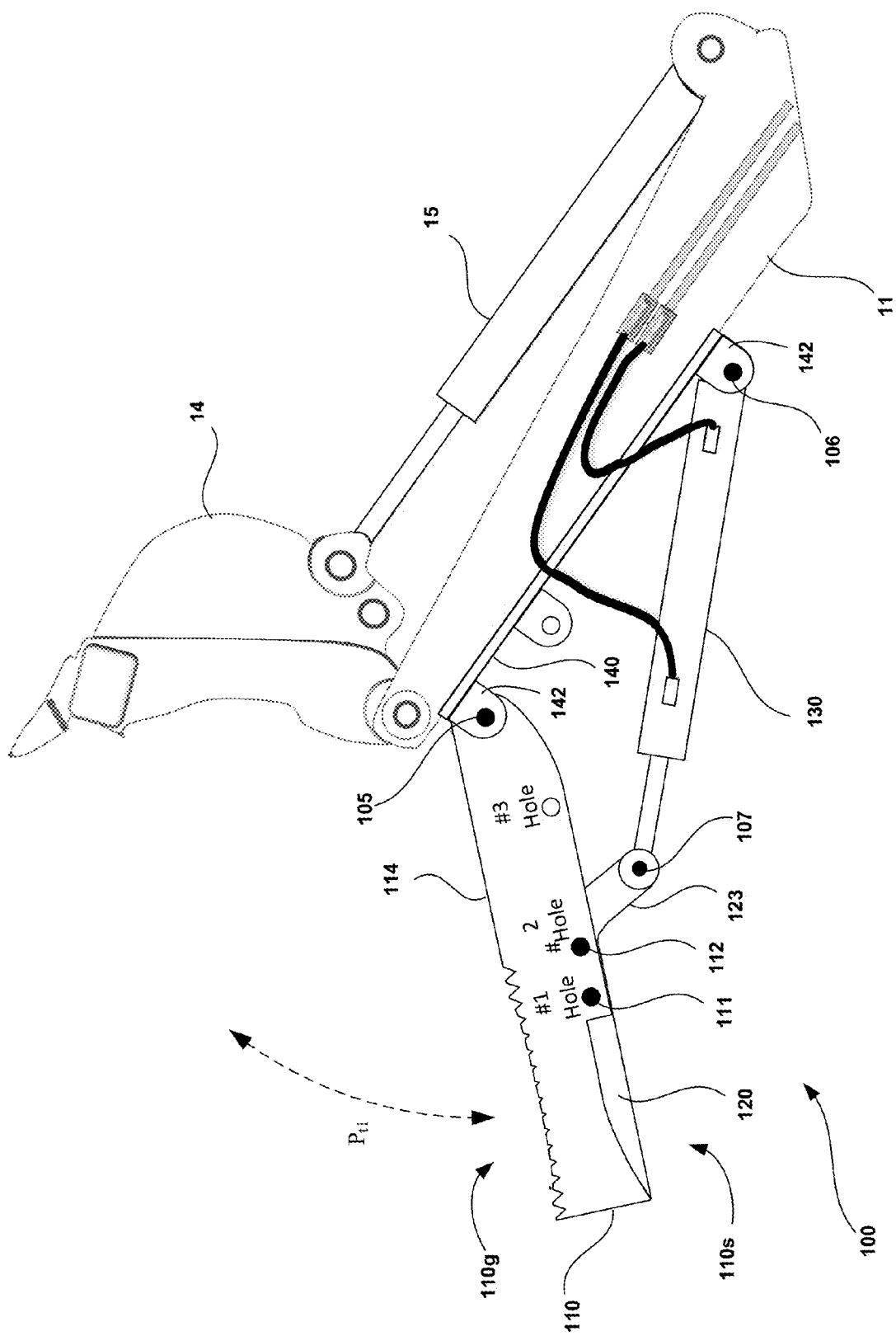
FIG. 2 is a side view of a shearing implement attached to an excavator boom, in a grasping configuration in accordance with an embodiment of the invention.

An exemplary embodiment of the invention will now be discussed in more detail with reference to FIGS. 2-9. With reference specifically to FIG. 2, a shearing implement 100 according to an embodiment of the invention is shown attached to a boom 11 of a conventional excavator having a bucket 14 that is hydraulically pivotable using the bucket cylinder 15. The shearing implement 100 has a thumb 110 and a shearing blade member 120. In the illustrated embodiment, the thumb 110 is attached to the boom 11 by a boom bracket 140. In other embodiments the thumb 110 may be directly attached to the boom 11 or to a preexisting connection point attached to the boom 11. For example, the thumb 110 may share the same attachment point as the bucket 14. A pivotable attachment to the boom bracket adjacent the end of the boom 11 allows the thumb 110 to be pivoted (as illustrated by the arc $P_{t1}$) to cooperate with the pivotable bucket 14 to grasp material in a conventional manner. The thumb 110 has a grasping side 110g that faces in the direction of the bucket 14 and an opposite shearing side 110s. A hydraulic thumb cylinder 130 is attached at one end to the boom bracket 140 and at its other end to the shearing blade member 120. In another embodiment, the cylinder may be attached directly to the boom 11 or a preexisting connection point on the boom 11 instead of the boom bracket 140. It will be understood that while the illustrated embodiment uses a hydraulic cylinder, any suitable form of linear actuator may be used in its stead.

In the illustrated embodiment, the shearing blade member 120 is substantially L-shaped, but in other embodiments, it may be shaped differently. The shearing blade member 120 is pivotably connected to the thumb 110 at the #1 hole, which is located near the cutting edge of the thumb 110 and apart from both the thumb assembly pivot point 105 and the grasping side 110g of the thumb 110. This allows the blade edge 122 of the shearing blade member 120 to pivot toward and away from the shearing side 110s of the thumb 110 (as illustrated by the arc $P_{b1}$ in FIG. 8). The shearing blade member 120 is attached to the thumb 110 with a pivot pin 111. In other embodiments, the shearing blade member 120 may be pivotably attached to the thumb 110 by other means. In FIG. 2, the shearing implement 100 is shown in its grasping configuration in which the shearing blade member 120 is locked in a closed position relative to the thumb 110. The shearing blade member 120 is locked by a pin 112 inserted though the #2 holes in thumb wall members 114 and shearing blade member 120, which are positioned so as to be in registration when the shearing blade member 120 is in the closed position. Connecting the thumb 110 to the shearing blade member 120 at the #2 hole prevents pivoting of the shearing blade member 120 relative to the thumb 110. While the pinning approach provides a simple way to lock the shearing blade member 120 in place relative to the thumb 110, it will be understood that other locking mechanism, such as clamps or the like, could also be used. In closed and locked blade configuration, axial extension and retraction of the linear actuator 130 causes the thumb 110 to rotate about its attachment point to engage and grasp objects between the thumb 110 and the bucket 14.

As will be discussed in more detail hereafter, the configuration of the thumb 110 and the shearing blade member 120 may be changed from the locked configuration shown in FIG. 2 to a cutting configuration by removing the locking pin 112 and, preferably, adding a stabilizer bar that limits rotation of the thumb 110 relative to the boom 11.

Figure 3:
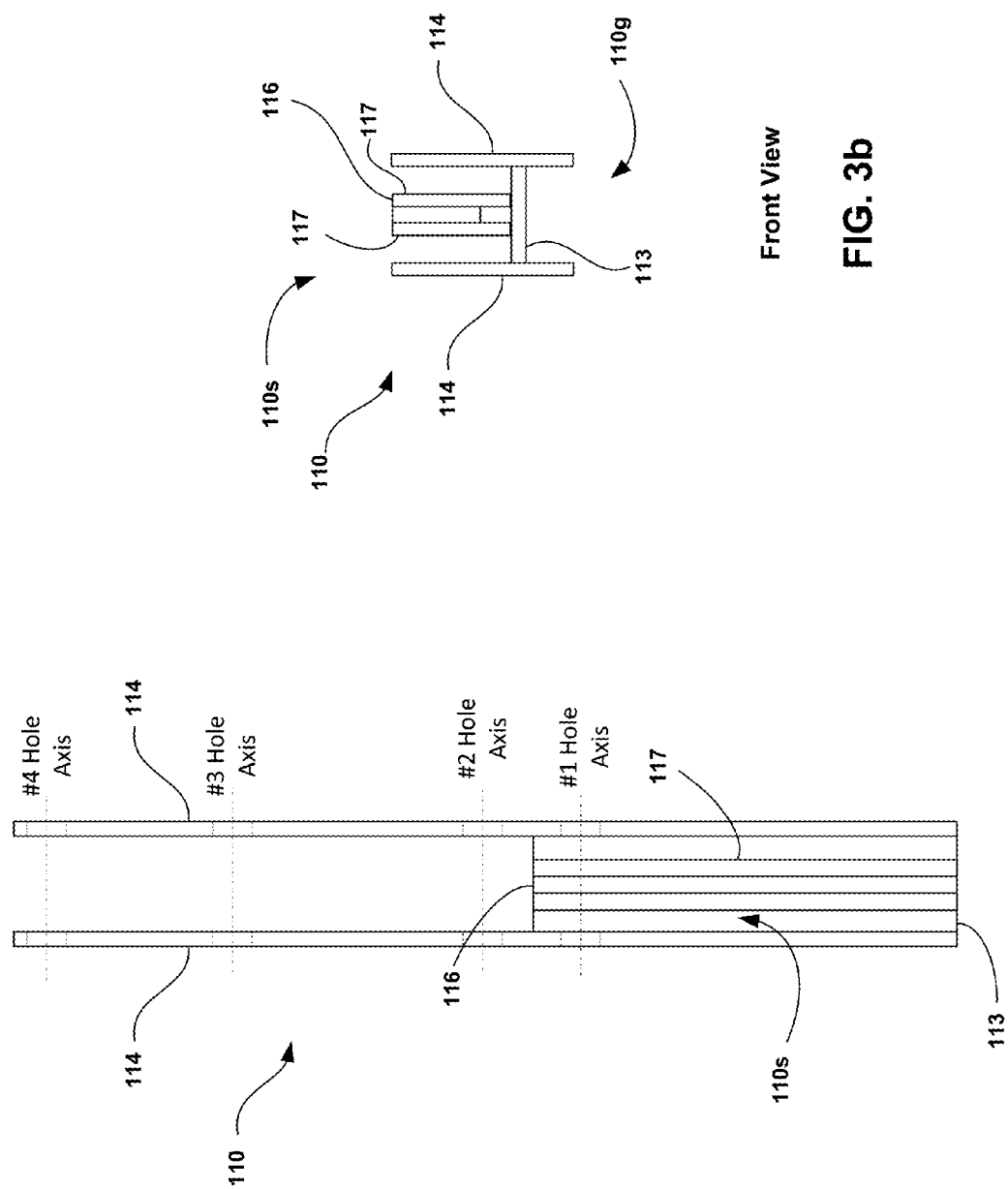
FIGS. 3a and 3b are top and front views of a thumb usable in a shearing implement according to an embodiment of the invention.

Individual components of the shearing implement 100 are shown in FIGS. 3-6. FIG. 3 illustrates top and front views of the thumb 110. The thumb 110 comprises two elongate thumb wall members 114 and a base member 113. The thumb 110 may have a blade receiver 116 on the shearing side 110s of the base member 113. In some embodiments, instead of two elongate thumb wall members 114 and a base member 113, the thumb 110 may be a single piece of material with an integral U-shaped channel on the shearing side 110s. The blade receiver 116 is formed from two blade receiver sides 117 spaced so as to receive a blade portion of the shearing blade member 120 therebetween. In one embodiment, blade receiver 116 may be part of an integral thumb member body. In yet another embodiment, thumb 110 may not have a blade receiving element.

As shown in FIGS. 3 and 4, the elongate thumb wall members 114 are provided with coaxial holes #1, #2, #3, #4 configured to slidably receive pins that serve to pivotably attach the components to one another. In another embodiment, one or both elongate thumb wall members 114 may be formed with threaded holes, or other means to fasten components to one another. As shown, each elongate thumb wall member 114 may be formed with teeth 119 on its grasping side 110g to enhance load engagement and grip. The teeth 119 may be machined to present an arcuate gripping profile. The elongate thumb wall members 114 may be formed with a thumb wall member blade receiving edge 115 on the shearing side 110s of the thumb 110 that is complimentary to the profile of the blade edge 122 of the shearing blade member 120 (discussed below). This complimentary profile allows for a target object to be held tightly between shearing blade member 120 and the blade receiver 116 immediately prior to cutting.

As shown in FIG. 5, the blade receiver sides 117 may have a blade receiver edge 118 that also has a profile that is complimentary to the blade edge 122 of the shearing blade member 120.

Figure 6:
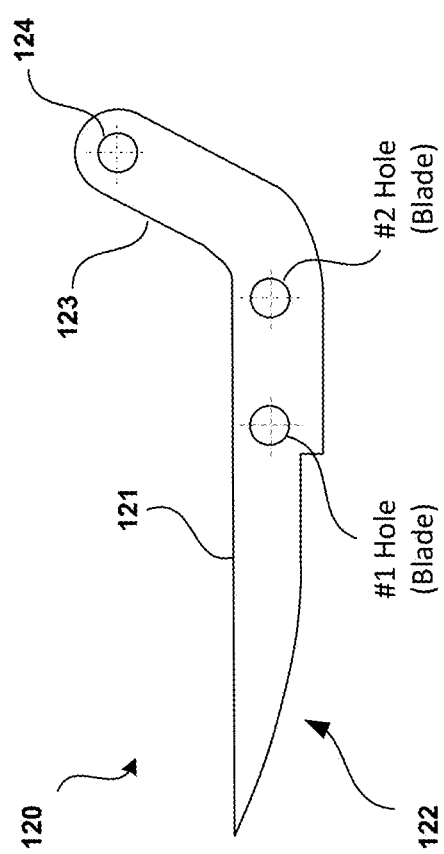
FIG. 6 is a side view of a shearing blade member usable in a shearing implement according to an embodiment of the invention.

As shown in FIG. 6, the shearing blade member 120 has a blade portion 121 and an attachment portion 123 that extends at an angle from one end of the blade portion 121. The blade portion 121 has a blade edge 122 with a defined profile. Blade edge 122 may be sharpened to assist in shearing target objects. Similar to the elongate thumb wall members 114, the shearing blade member 120 may have holes configured to slidably receive pins for pivotably attaching components to one another. It will be understood that matching hole numbers on different parts (e.g., #1 Hole and #2 Hole) are intended to indicate that these holes will be in registration when the device is assembled so that they can receive a single pin. It will also be understood that the degree of angle between the blade portion 121 and the attachment portion 123 and the specific hole/pivot locations may be selected to provide the most desirable mechanical advantage for pivoting the shearing blade member 210 during a shearing operation and for pivoting the entire thumb during a grasping operation.

As shown in FIG. 7, the boom bracket 140 has a base plate 141 and a series of individual bracket members 142 attached to the base. The base plate is configured for attachment to the boom 11 (e.g., by welding). Each bracket member 142 has a hole configured for slidably receiving pins for pivotably attaching the other components to the boom bracket 140. The holes in brackets 142 on opposite sides of the base 141 are in registration so as to receive a single pin therethrough.

As shown in FIG. 2, a pivot pin 105 is used to pivotably attach the thumb sides 114 to two bracket members 142 (only one is visible) adjacent the end of the boom 11. A second pivot pin 106 is used to attach a proximal end of the hydraulic cylinder (or other linear actuator) 130 to the two brackets 142 (only one is visible) at the other end of the boom bracket 140. Another pivot pin 107 is used to attach the distal end of the cylinder 130 to cylinder attachment hole 124 through the attachment portion 123 of the shearing blade member 120. With pin 112 positioned through Holes #2 in both the thumb wall members 114 and the shearing blade member 120, the shearing blade member 120 is locked in place against the thumb 110 with the blade edge 122 received within the blade receiver 116. When the shearing blade member 120 is in this closed and locked configuration, axial extension and retraction of the cylinder 130 results in no change in position of the shearing blade member 120 with respect to the thumb 110, but does result in rotation of the thumb 110 about pivot pin 105.

Figure 8:
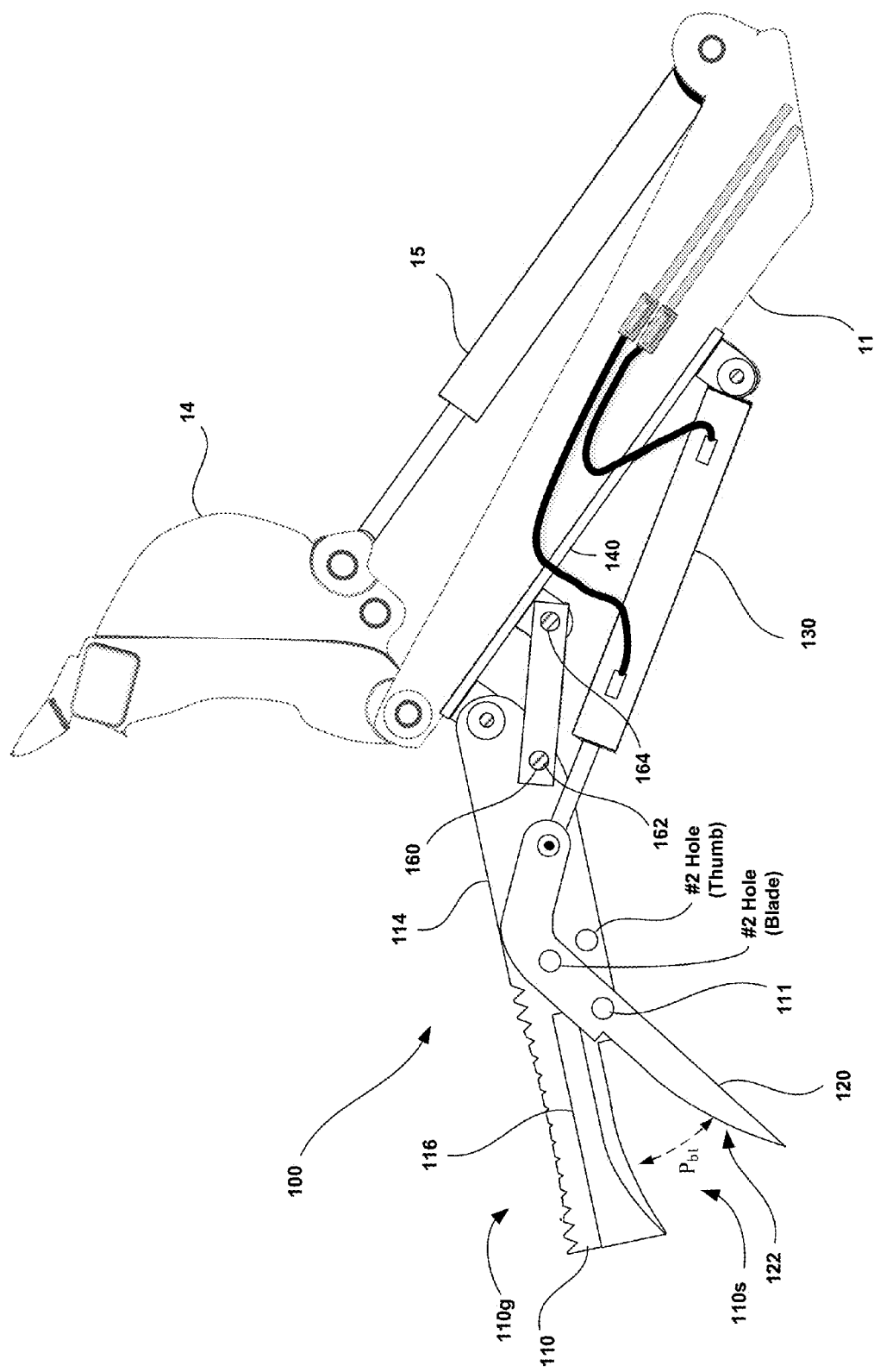
FIG. 8 is a side view (with some features removed) of a shearing implement attached to an excavator boom in a cutting configuration in accordance with an embodiment of the invention.

FIG. 8 illustrates the shearing implement 100 in its cutting/shearing configuration with one of the thumb wall members 114 and the left side brackets 142 removed for viewing purposes. In this configuration, pin 112 is removed from the #2 Hole through the thumb wall members 114 and the shearing blade member 120. This allows the shearing blade member 120 to pivot around pin 111. In addition, a stabilizer bar 160 may be attached to the thumb 110 and the boom bracket 140. The stabilizer bar 160 is a rigid member having a hole formed therethrough at each end for slidably receiving pins. One of these holes may be positioned in registration with the #3 Hole in the elongate thumb wall members 114 to receive a single pin 162 therethrough. The second stabilizer bar hole may be positioned in registration with the remaining two brackets 142 on the boom bracket 140 for receiving another pin 164 therethrough. In another embodiment, the second stabilizer bar hole may be attached to the bucket 14 pivot point, or any other point on the boom 11 that is apart from pivot pin 105.

The combined effect of the removal of pin 112 and the addition of the stabilizer bar 160 is that when the hydraulic cylinder 130 is extended, the cutting edge 122 of the shearing blade member 120 is rotated away from the thumb 110. When the cylinder 130 is retracted, the blade edge 122 is rotated toward the thumb 110. In both cases, the thumb 110 itself remains fixed relative to the boom 11 and the bucket 14.

The pins and receiving holes of the shearing implement 100 may be configured so that the device can be quickly and easily converted from the grasping configuration to the shearing configuration and vice versa. While in typical embodiments, this would be done manually, it will be understood that this process may be fully automated.

It can readily be seen that when the shearing implement 100 is in the shearing configuration and the shearing blade member 120 is in an open position as shown in FIG. 8, a target object to be cut can be positioned between the blade edge 122 and the shearing side 110s of the thumb 110. Retraction of the hydraulic cylinder 130 can then be used to move the shearing blade member 120 toward the closed position shown in FIG. 2 to engage and trap the target object between the cutting edge 122 and the blade receiver 116. Further retraction of the of the hydraulic cylinder 130 will cause the target object to be cut/sheared by the shearing blade member 120 and the blade receiver 116 of the thumb 110.

Figure 9:
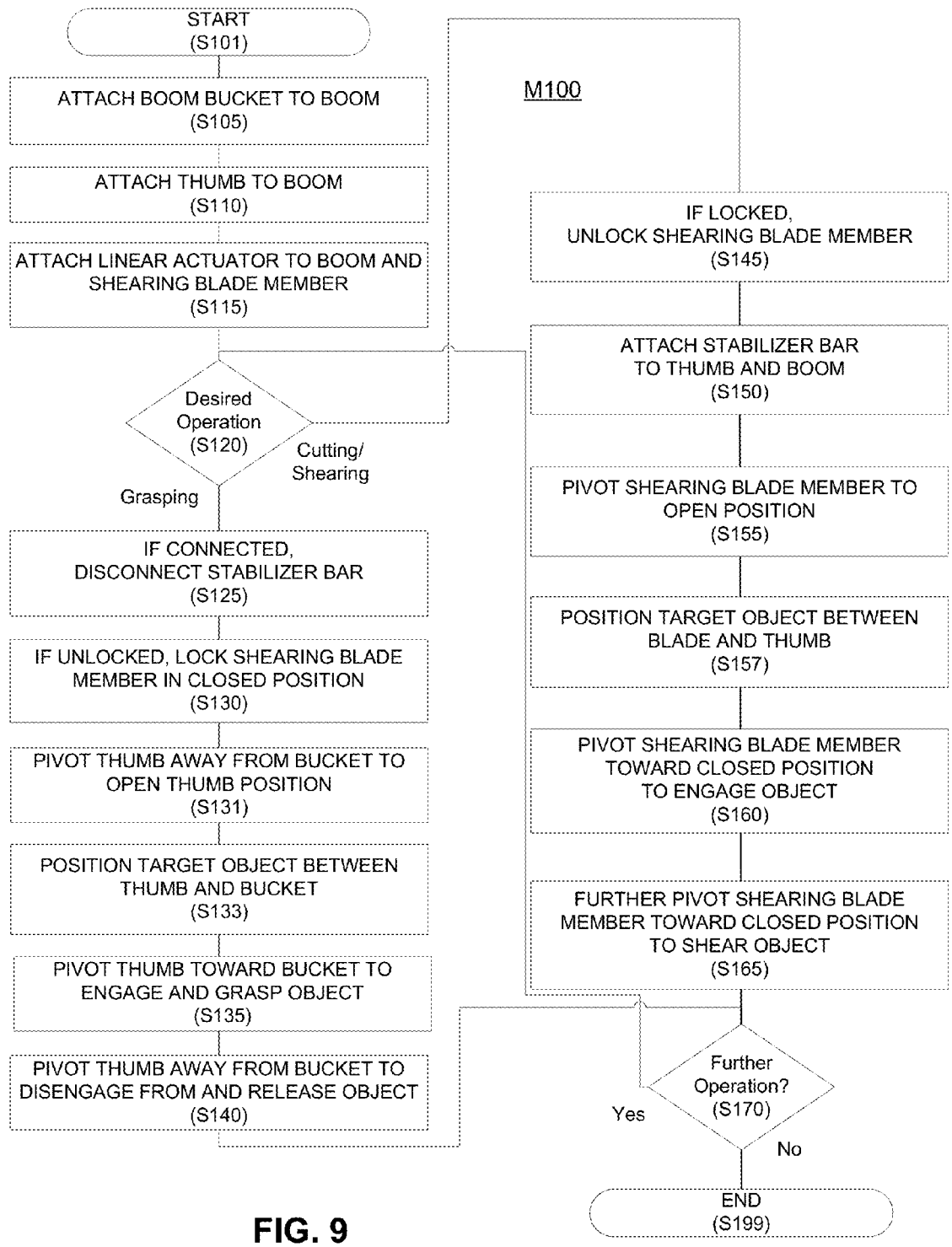
FIG. 9 is a flow diagram of a method for using a shearing implement according to an embodiment of the invention.

Referring to FIG. 9, an illustrative method M100 for using the shearing implement 100 is described. The method M100 begins at S101. At S105, the boom bracket 140 is attached to the boom 11. The boom bracket 140 may be permanently attached to the boom 11 by welding, or may be removably attached by bolting or the like. In some instances, the thumb 110 and the hydraulic cylinder 130 may be attached directly to attachment points on the boom. In such cases, there is no need for a separate boom bracket 140, and this action may be skipped.

At S110, the thumb 110 is pivotably attached to the boom 11 at or adjacent the boom end where the bucket 14 is attached. If the boom bracket 140 is in place, the thumb may be attached to the boom 11 using the boom bracket 140. In such cases, the thumb 110 is attached by positioning the proximal ends of the thumb walls 114 on opposite sides of the bracket element 142 nearest the bucket 14 and inserting a pin 105 through holes #4 in the thumb walls 114 and through the hole in the bracket element 142. In embodiments where there is no boom bracket 140, the thumb 110 may be pivotably attached to existing mounting points on or adjacent to the boom 11.

At S115, one end of the hydraulic cylinder (or other linear actuator) 130, is attached to the boom 11 and the other end is attached to the shearing blade member 120. The first end may be attached to the boom 11 using a pin 106 inserted through a bracket element 142 of the boom bracket 140 at a location apart from the bucket end of the boom 11. The second end is attached to the shearing blade member 120 using a pin 107 inserted through the hole 124 in the attachment portion 123. The cylinder attachments may be made with a pin, with a bolt and nut, or other similar method. In embodiments where there is no boom bracket 140, the linear actuator may be attached to an existing mounting point on the boom 11.

It will be understood that, in some instances, the foregoing steps need only be conducted once for all subsequent uses of the shearing implement 100. Alternatively, some or all of the steps may be repeated if the implement 100 is removed from the excavator after use.

At S120, a user may decide if he or she wants to operate the shearing implement 100 in a grasping mode or a cutting/shearing mode. If the user opts for operation in the grasping mode, subsequent actions may be taken to place the shearing implement 100 in a grasping configuration and then use the implement 100 in cooperation with the bucket 14 to grasp a target object. If the user opts for operation in the cutting mode, subsequent actions may be taken to place the shearing implement 100 in a cutting configuration and then use the implement 100 to engage and cut a target object.

If at S120, the user decides to operate the shearing implement 100 in the grasping configuration, actions S125 and S130 may be taken to place the implement 100 into the grasping configuration. If the stabilizer bar 160 is connected between the thumb 110 and the boom 11, at S125, the user disconnects the stabilizer bar 160 from one or both of the thumb 110 and the boom 11. In some embodiments, disconnecting the stabilizer bar 160 may include removal of pin 164. In other embodiments, disconnecting the stabilizer bar 160 may include removal of both pins 164 and 162 and complete removal of the stabilizer bar 160 from the implement 100.

At S130, the shearing blade member 120 is placed in its closed position (if not already in the closed position) and is locked in this position using a blade locking element. The blade locking element may be any suitable member or device (such as, for example, a clamp, latch, or threaded fastener) for holding the shearing blade member 120 against the thumb 110 so that the thumb 110 and the shearing blade member 120 move and operate together. In a particularly suitable embodiment, the blade locking element is a pin such as pin 112 that is insertable through the holes #2 in the thumb walls 114 and the shearing blade member 120. In this embodiment, the action of locking the shearing blade member 120 includes inserting pin 112 through the aligned holes #2 in the thumb 110 and the shearing blade member 120.

To prepare for grasping a target object, at S131, the thumb 110 is rotated away from the bucket 14 to an open thumb position such as that shown in FIG. 2. At S133, the target object is positioned between the bucket 14 and the grasping side 110g of the thumb 110. This may be accomplished by moving the target object into this position, but will usually be accomplished by maneuvering the excavator and the boom 11 to place the thumb 110 and the bucket 14 on opposite side of the target object or a portion thereof. At S135, the thumb 110 is rotated about the pivot pin 105 toward the bucket 14 so as to engage the target object. This may be accomplished by extending the linear actuator 130, thereby causing the thumb 110 to rotate relative to the boom 11. At the same time, the bucket 14 may be caused to rotate about its attachment to the boom 11 to cause it to engage the target object from the opposite side. Alternatively, the bucket 14 may be held in an engagement position while the thumb 110 is rotated to cause the target object to be pushed into engagement with the bucket 14. The cooperative engagement between the thumb 110 and bucket 14 enables the trapping and grasping of the target object between the thumb 110 and the bucket 14.

The target object will typically be held in this condition while the excavator maneuvers itself and or the boom 11 to a position where the target object is to be released. Once in position, the target object may be released at S140. This may be accomplished by retracting the linear actuator 130, thereby causing the thumb 110 to pivot away from the bucket 14, ultimately releasing the target object from between the thumb 110 and the bucket 14. At the same time, the thumb 110 is being rotated away from the bucket 14, the bucket 14 may be rotated in the opposite direction to further facilitate the release of the target object.

If at S120, the user opts to operate the shearing implement 100 in the shearing mode, actions S145 and S150 may be taken to place the implement 100 into the shearing configuration. If the shearing blade member 120 is locked to the thumb 110, then at S145, the shearing blade member 120 is unlocked by disengaging the blade locking element. In the illustrated embodiment, this action includes removing pin 112 from the #2 holes in the thumb wall members 114 and the shearing blade member 120.

At S150, the user may optionally connect the stabilizer bar 160 to the boom 11 and the thumb 110. With the implement 100, this involves placing the stabilizer bar 160 so that one end is positioned between the intermediate bracket elements 142 of the boom bracket 140 with the hole in the end of the stabilizer bar 160 in registration with the holes in the bracket elements 142 and inserting pin 105 through these holes. The opposite end of the stabilizer bar 160 is placed between the proximal ends of the thumb wall members 114 with the hole on that end of the stabilizer bar 160 in registration on one side of the with the #3 holes in the thumb wall members and inserting pin 162 through these holes. In another embodiment where there is no boom bracket, the hole of the stabilizer bar 160 near its proximal end may be connected to a preexisting connection point on or adjacent to the boom 11. The stabilizer bar 160 serves to prevent the thumb 110 from rotating relative to the boom 11. It will be understood that there are other potential mechanisms that could be used to prevent such rotation. If these are used, the stabilizer bar 160 may be omitted.

To prepare for cutting a target object, at S155, the shearing blade member 120 is rotated away from its closed blade position in engagement with the shearing side 110$s$ of the thumb 110 toward an open blade position such as that shown in FIG. 8. This rotation may be accomplished by extending the linear actuator 130, which causes the shearing blade member 120 to pivot around the pivot pin 111 relative to the thumb 110. At S157, the target object is positioned between the blade edge 122 and the shearing side 110$s$ of the thumb 110. This may be accomplished by moving the target object into this position, but will usually be accomplished by maneuvering the excavator and the boom 11 to place the blade edge 122 and the thumb 110 on opposite side of the target object or a portion thereof. With the target object in this position, the shearing blade member 120 is rotated toward its closed position so that the blade edge 122 engages the target object at S160 and traps it between the blade edge 122 and the shearing side 110$s$ of the thumb 110. This may be accomplished by retracting the linear actuator 130, which causes the shearing blade member 120 to pivot around pivot pin 11 back toward the closed blade position relative to the thumb 110. At S165, the shearing blade member 120 is further rotated toward its closed position so that the blade edge 112 cooperates with the blade receiver 116 to cut through the target object After either S140 or S165 is completed, a decision S170 may be made as to whether operation of the shearing implement 100 is to continue. If such is the case, the appropriate method actions are repeated. If operation is not to be continued, the method ends at S199.

Another exemplary embodiment of the invention provides a shearing implement in which a first linear actuator is used to rotate the thumb relative to the boom to which it is attached, and a second linear actuator is used to rotate the cutting blade relative to the thumb. Both actuators may be hydraulic cylinders connected or connectable to the existing hydraulic system of an excavator.

With reference to FIGS. 10-15, a shearing implement 200 according to such an embodiment is shown attached to the boom 21 of the same conventional excavator shown in the previous. The shearing implement 200 has a thumb 210 and a shearing blade member 220. In the illustrated embodiment, the thumb 210 is attached to the boom 11 by a boom bracket 240. In other embodiments the thumb 210 may be directly attached to the boom 11 or to a preexisting connection point attached to the boom 11. A pivotable attachment to the boom bracket 240 adjacent the end of the boom 11 allows the thumb 210 to be pivoted (as illustrated by the arc $P_{t2}$) to cooperate with the pivotable bucket 14 to grasp material in a conventional manner. The thumb 210 has a grasping side 210$g$ that faces in the direction of the bucket 14 and an opposite shearing side 210$s$. A first linear actuator 250 is pivotably attached at one end to the shearing blade member 220 and at its other end to the thumb wall members 214. A second linear actuator 230 is attached at one end to the boom bracket 240 and at its other end to the thumb wall members 214. In some embodiments, the second actuator 230 may be attached directly to the boom 11 or a preexisting connection point on the boom 11 instead of the boom bracket 240.

Individual components of the shearing implement 200 are shown in FIGS. 11-14. FIG. 11 illustrates top and front views of the thumb 210. The thumb 210 comprises two elongate thumb wall members 214 and a base member 213. The thumb 210 has a blade receiver 216 on the shearing side 210$s$ of the base member 213. In some embodiments, instead of two elongate thumb wall members 214 and a base member 213, the thumb 210 may be a single piece of material with an integral U-shaped channel on the shearing side 210$s$. The blade receiver 216 is formed from two blade receiver sides 217 spaced so as to receive a blade portion of the shearing blade member 220 therebetween. In some embodiments, the blade receiver 216 may be part of an integral thumb member body.

Figure 12:
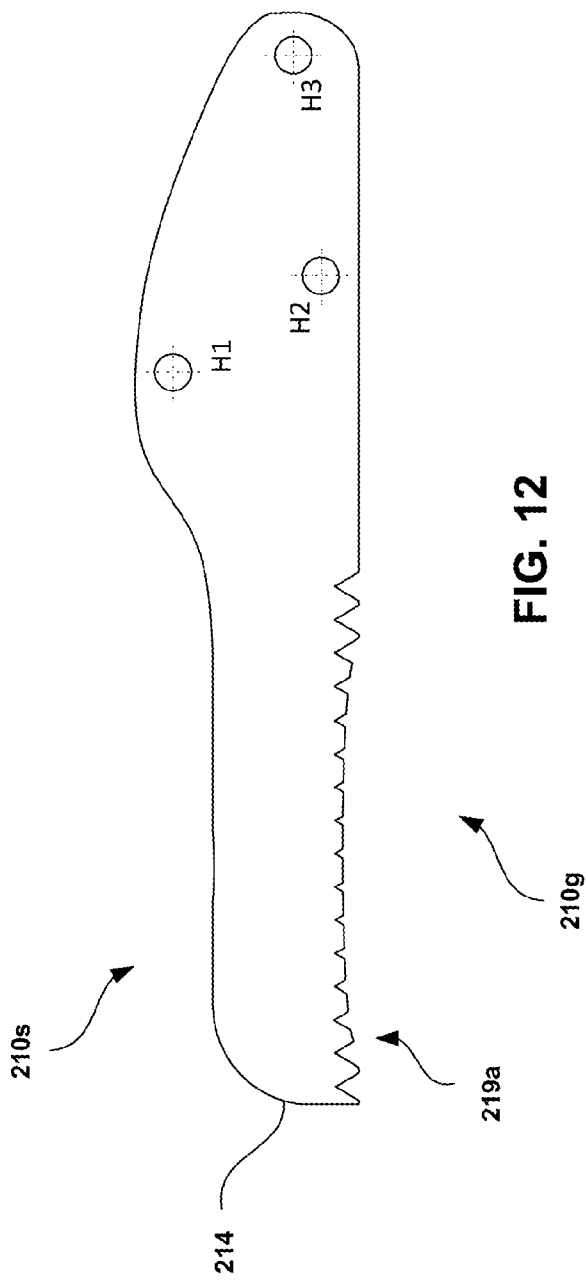
FIG. 12 is a side view of a thumb wall member of the thumb of FIGS. 3a and 3b.

As shown in FIGS. 11 and 12, the thumb wall members 214 are provided with coaxial holes H1, H2 and H3. These holes are configured to slidably receive pins that serve to pivotably attach components to one another. The H3 hole is positioned at a proximal end of the thumb wall members 214 for pivotable attachment of the thumb 210 to the boom 11. The H1 hole is positioned for attachment of the distal end of the second linear actuator 230. The H2 hole is positioned for attachment of the first end of the first linear actuator 250 to the thumb 210 as will be discussed below. As shown, each elongate thumb wall member 214 may be formed with teeth 219$a$ on its grasping side 210$g$ to enhance load engagement and grip. The teeth 219$a$ may be machined to present an arcuate gripping profile. The elongate thumb wall members 214 may be formed with a thumb wall member blade receiving edge 215 on the shearing side 210$s$ of the thumb 210 that is complimentary to the profile of the blade edge 222 of the shearing blade member 220 (discussed below). This complimentary profile allows for a target object to be held tightly between shearing blade member 220 and the blade receiver 216 immediately prior to cutting.

Figure 13:
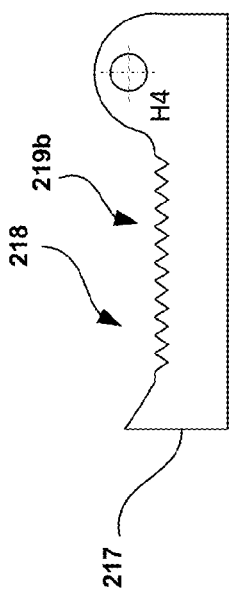
FIG. 13 is a side view of a blade receiver side of the thumb of FIGS. 3a and 3b.

The blade receiver sides 217 are provided with coaxial holes H4 positioned and configured for pivotable attachment of the shearing blade member 220 using blade pivot pin 212. As shown in FIG. 13, the blade receiver sides 217 may have a blade receiver edge 218 that also has a profile that is complimentary to the blade edge 222 of the shearing blade member 220. The blade receiver sides may also have teeth 219b.

Figure 14:
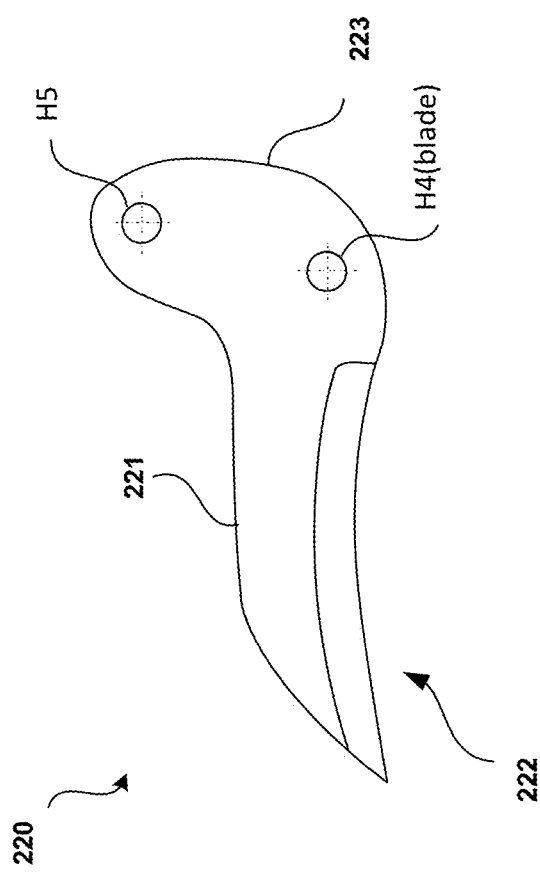
FIG. 14 is a side view of a shearing blade member usable in a shearing implement according to an embodiment of the invention.

The shearing blade member 220 is substantially L-shaped, but in other embodiments, it may be shaped differently. As shown in FIG. 14, the shearing blade member 220 has a blade portion 221 and an attachment portion 223 that extends at an angle from one end of the blade portion 221. The blade portion 221 has a blade edge 222 with a defined profile. Blade edge 222 may be sharpened to assist in shearing target objects. The shearing blade member 220 has a hole H4 (blade) positioned and configured so that when assembled with the thumb 210, the hole H4 (blade) is in registration with the holes H4 in the blade receiver sides 217. The hole H4 (blade) is further configured to receive the blade pivot pin 212 inserted through the holes H4 so that the shearing blade member 220 is rotatable about the axis of the pin 212. This allows the blade edge 222 of the shearing blade member 220 to pivot toward and away from the shearing side 210s of the thumb 210 (as illustrated by the arc $P_{b2}$ in FIG. 15). The shearing blade member 220 also has a hole H5 near the proximal end of the attachment portion 223. This hole H5 is positioned and configured for attachment of the second end of the first linear actuator 250 using pin 252 so that extension and retraction of the first linear actuator 250 causes rotation of the shearing blade member 220 relative to the thumb 210.

It will be understood that the degree of angle between the blade portion 221 and the attachment portion 223 and the specific hole/pivot locations may be selected to provide a desirable mechanical advantage for pivoting the shearing blade member 210 during a shearing operation.

Figure 10:
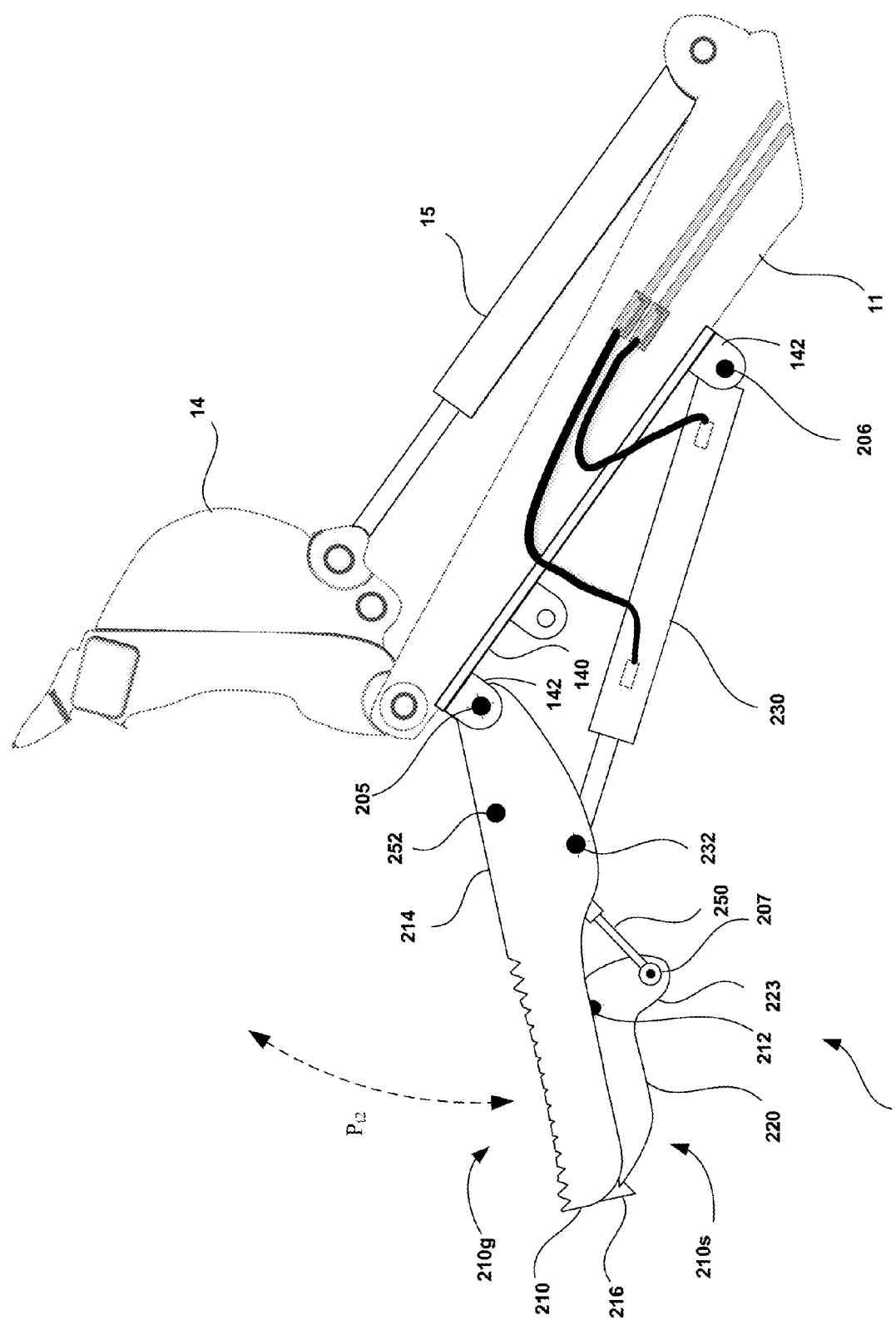
FIG. 10 is a side view of a shearing implement attached to an excavator boom, in a grasping configuration in accordance with an embodiment of the invention.

In FIG. 10, the shearing implement 200 is shown in its grasping configuration. In the configuration, the shearing blade member 220 may be held in a closed position relative to the thumb 210 by the full extension of the linear actuator 250. Alternatively or in addition, the shearing blade member 220 may be locked in the closed position by a pin or other locking mechanism as previously discussed. In the closed blade configuration, axial extension and retraction of the second linear actuator 230 causes the thumb 210 to rotate about its attachment point 205 to engage and grasp objects between the thumb 210 and the bucket 14.

Figure 15:
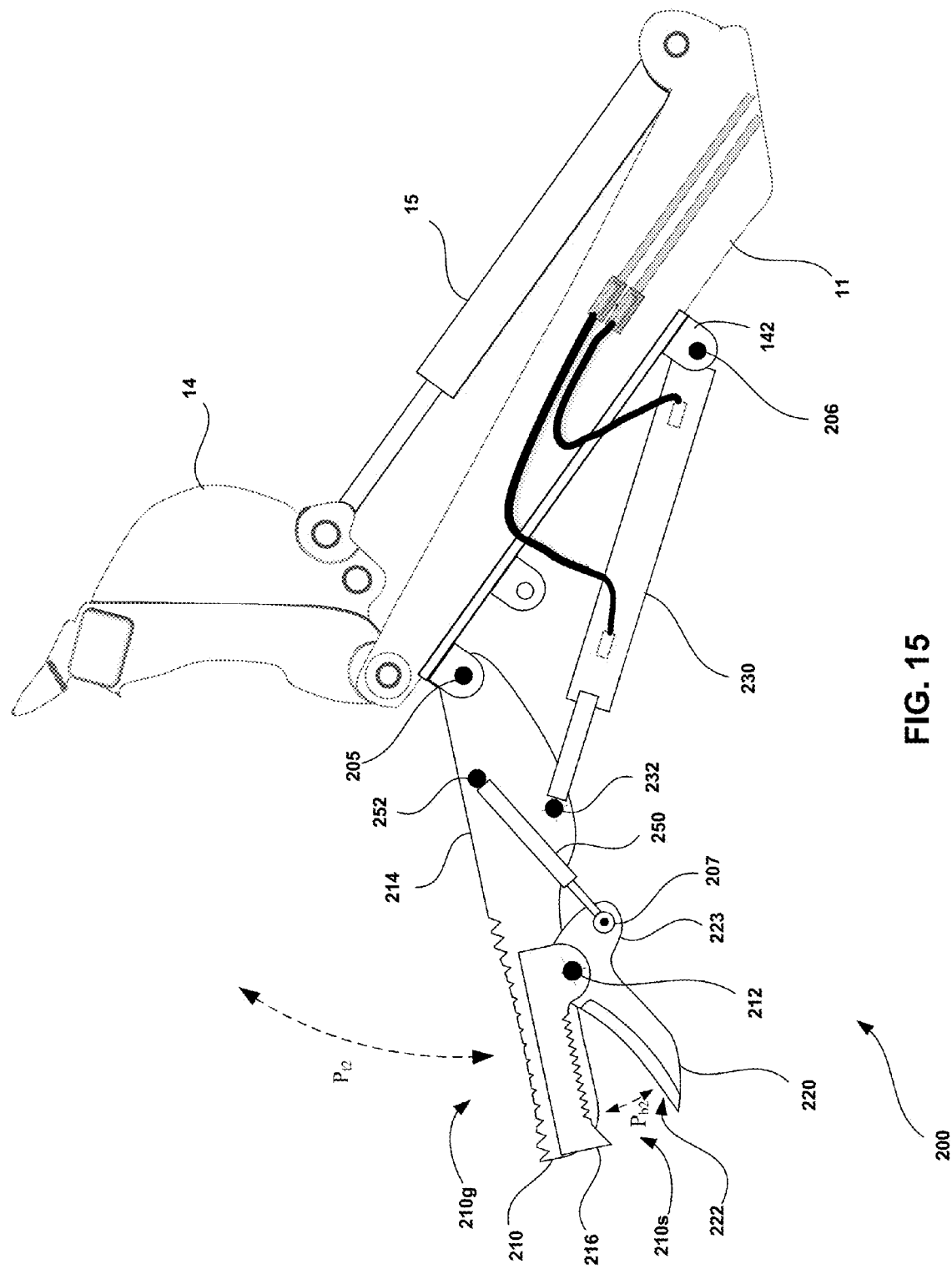
FIG. 15 is a side view (with some features removed) of a shearing implement attached to an excavator boom in a cutting configuration in accordance with an embodiment of the invention.

With the thumb 210 held in any rotational position by the second linear actuator 230, the shearing implement 200 may be put into a cutting mode by activating the first linear actuator 250 for opening and closing the shearing blade member 220. FIG. 15 (in which one thumb wall member is removed for viewability) illustrates the shearing implement 200 in the cutting mode with the shearing blade member 220 rotated to an open position using the first linear actuator 250. As noted above, the linear actuators 230, 250 may be hydraulic cylinders connected to an existing hydraulic system. In such embodiments, routing of hydraulic pressure to one or both of the cylinders may be accomplished/controlled through the use of a diversion valve (not shown).

It will be understood that in some cases, it may be desirable to further lock the thumb 210 in a particular rotational position though the use of a stabilizer bar similar to that described for the previous embodiment.

The shearing implement 200 may incorporate the same boom bracket 140 described previously, As shown in FIG. 10, a pivot pin 205 is inserted through holes H3 to pivotably attach the thumb sides 214 to two boom bracket members 142 (only one is visible) adjacent the end of the boom 11. A second pivot pin 206 is used to pivotably attach the proximal end of the second linear actuator 230 to the two brackets 142 (only one is visible) at the other end of the boom bracket 140. Another pivot pin 232 is used to attach the distal end of the second linear actuator 230 to attachment holes H1 through the thumb wall members 214. Yet another pivot pin 252 is disposed within holes H2 and is used to pivotably attach the proximal end of the first actuator 250 to the thumb wall members 214. The distal end of the first linear actuator 250 is pivotably attached to the shearing blade member 220 at hole H5 by pin 207.

FIG. 15 illustrates the shearing implement 200 in it's a cutting/shearing configuration with one of the thumb wall members 214 removed for viewing purposes. In this embodiment, it can be seen that the rotation of the shearing blade member 220 is substantially independent of the rotation of the thumb 210 as a whole, regardless of the position of the thumb and the activation status of the second linear actuator 230, when the first linear actuator 250 is extended, the blade edge 222 of the shearing blade member 220 is rotated toward the thumb 210. When the linear actuator 250 is retracted, the blade edge 222 is rotated away from the thumb 210.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its preferred embodiment, it is to be understood that this disclosure is only illustrative and exemplary of the present invention and is made merely for the purposes of providing a full and enabling disclosure of the invention. Many modifications to the embodiments described above can be made without departing from the spirit and scope of the invention. Accordingly, the foregoing disclosure is not intended to be construed or to limit the present invention or otherwise to exclude any other such embodiments, adaptations, variations, modifications and equivalent arrangements.

What is claimed is:

1. A shearing implement for use with an excavator having a bucket pivotably attached to a bucket end of a boom, the shearing implement comprising:
   a thumb having
      a base with a grasping surface and a blade receiving surface on opposite sides of the base and proximal and distal base ends and
      a pair of elongate thumb wall members, each thumb wall member being attached to the base and extending proximally from the proximal base end, the thumb wall members having proximal wall end portions attachable to the boom so as to be pivotable relative to the boom at a thumb pivot at or adjacent the bucket end;
   a shearing blade member having
      a proximal attachment portion with a proximal blade member end and a distal blade portion with a distal blade member end,
the shearing blade member being pivotably attached to the thumb at a blade pivot axis that is spaced apart from both the proximal and distal blade member ends and both the proximal wall end and the distal base end, the blade portion having a cutting edge distal to the blade pivot axis, the shearing blade member being configured to pivot between a closed position in which the cutting edge engages the blade receiving surface of the thumb base and an open position in which the cutting edge is rotationally spaced apart from the blade receiving surface of the thumb base;
a blade locking element configured to selectively lock the shearing blade member in the closed position; and
a first linear actuator having a first end attached to the shearing blade member and a second end attachable to the boom so that extension and retraction of the linear actuator causes the shearing blade member to rotate about the blade pivot axis,
wherein the first linear actuator and the thumb are attachable to the boom by a boom bracket assembly comprising a base plate, an actuator bracket to which the second end of the first linear actuator is pivotably attached and a thumb bracket to which the proximal wall end portions of the thumb wall members are pivotably attached
wherein the actuator bracket is spaced apart from the bucket end of the boom so that when the shearing blade member is locked in the closed position, extension or retraction of the first linear actuator causes the thumb and shearing blade member to rotate together about the thumb pivot point and so that when the shearing blade member is not locked, extension or retraction of the first linear actuator causes the shearing blade member to rotate about the blade pivot axis.

2. The shearing implement of claim 1, wherein the attachment portion has a first longitudinal axis and the blade portion of the shearing blade member has a second longitudinal axis that intersects the first longitudinal axis at an angle.

3. The shearing implement of claim 1, wherein at least a portion of the proximal attachment portion of the shearing blade member is disposed between the thumb wall members and is pivotably attached to the thumb by a pin that is coaxial with the blade pivot axis.

4. The shearing implement of claim 1, wherein extension of the first linear actuator causes the shearing blade member to rotate away from the closed position and subsequent retraction of the first linear actuator causes the shearing blade member to rotate toward the closed position.

5. The shearing implement of claim 1, wherein
the thumb wall members have coaxial wall locking holes distal to the blade pivot axis,
the proximal attachment portion of the shearing blade member has a blade locking hole positioned so as to be in registration with the wall locking holes when the shearing blade member is in the closed position, and
the blade locking element comprises a pin insertable through the thumb wall and blade locking holes when the shearing blade member is in the closed position.

6. The shearing implement of claim 1, wherein the first linear actuator is a hydraulic cylinder.

7. The shearing implement of claim 1, further comprising at least one rigid stabilizer bar selectively attachable to the boom and the thumb to prevent the thumb from rotating relative to the boom.

8. The shearing implement of claim 1 further comprising spaced apart blade receiving walls extending outward from the blade receiving surface and being configured to receive at least a portion of the shearing blade member therebetween when the shearing blade member is rotated into its closed position.

9. The shearing implement of claim 8, wherein each blade guide wall has a free edge facing outward relative to the blade receiving surface, the free edge being configured to cooperate with the cutting edge of the distal blade member in a shearing action when the shearing blade member is moved from its open position to its closed position.

10. A shearing implement for use with an excavator having a bucket pivotably attached to a bucket end of a boom, the shearing implement comprising:
a thumb having
a base with a grasping surface and a blade receiving surface on opposite sides of the base and proximal and distal base ends and
a pair of elongate thumb wall members, each thumb wall member being attached to the base and extending proximally from the proximal base end, the thumb wall members having proximal wall end portions attachable to the boom so as to be pivotable relative to the boom at a thumb pivot at or adjacent the bucket end;
a shearing blade member having
a proximal attachment portion with a proximal blade member end and
a distal blade portion with a distal blade member end,
the shearing blade member being pivotably attached to the thumb at a blade pivot axis that is spaced apart from both the proximal and distal blade member ends and both the proximal wall end and the distal base end, the blade portion having a cutting edge distal to the blade pivot axis, the shearing blade member being configured to pivot between a closed position in which the cutting edge engages the blade receiving surface of the thumb base and an open position in which the cutting edge is rotationally spaced apart from the blade receiving surface of the thumb base;
a first linear actuator having first and second ends, the first end being attached to the shearing blade member; and
a second linear actuator having a first end pivotably attached to the thumb and a second end pivotably attachable to the boom at a point spaced apart from the bucket end so that extension and retraction of the second linear actuator causes rotation of the thumb about the thumb pivot point,
wherein the second end of the first linear actuator is pivotably attached to the thumb so that extension and retraction of the first linear actuator causes rotation of the shearing blade member about the blade pivot axis.

11. A shearing implement for use in place of a grasping thumb of an excavator having a bucket pivotably attached to a bucket end of a boom and a first linear actuator attached at a first end to the boom and attachable at a second end to the grasping thumb and being operable to selectively rotate the grasping thumb between a non-grasping configuration and a grasping configuration in which the thumb engages a portion of the bucket, the shearing implement comprising:
a replacement thumb having
a base with a grasping surface and a blade receiving surface on opposite sides of the base and proximal and distal base ends and a pair of elongate thumb wall members, each thumb wall member being attached to the base and extending proximally from the proximal base end, the thumb wall members having proximal wall end portions attachable to the boom so as to be pivotable relative to the boom at a thumb pivot at or adjacent the bucket end;

a shearing blade member having
   a proximal attachment portion with a proximal blade member end and
   a distal blade portion with a distal blade member end, the shearing blade member being pivotably attached to the replacement thumb by a blade pivot that is spaced apart from both the proximal and distal blade member ends and both the proximal wall end and the distal base end, the blade portion having a cutting edge distal to the blade pivot, the shearing blade member being configured to pivot between a closed position in which the cutting edge engages the blade receiving surface of the thumb base and an open position in which the cutting edge is rotationally spaced apart from the blade receiving surface of the thumb base; and a blade locking element configured to selectively lock the shearing blade member in the closed position, wherein pivotable attachment of the thumb wall members to the boom and attachment of a second end of the first linear actuator to the shearing blade member at a point proximal to the blade pivot point allows for operation of the shearing implement in a grasping mode in which the shearing blade member is locked in the closed position and extension or retraction of the first linear actuator causes the replacement thumb and the shearing blade member to rotate together about the thumb pivot point and in a shearing mode in which the shearing blade member is not locked and extension of the first linear actuator causes the shearing blade member to rotate about the blade pivot away from the closed position and subsequent retraction of the first linear actuator causes the shearing blade member to rotate about the blade pivot toward the closed position.

12. The shearing implement of claim 11, wherein
the thumb wall members have coaxial wall locking holes distal to the blade pivot,
the proximal attachment portion of the shearing blade member has a blade locking hole positioned so as to be in registration with the wall locking holes when the shearing blade member is in the closed position, and
the blade locking element comprises a pin insertable through the thumb wall and blade locking holes when the shearing blade member is in the closed position.

13. The shearing implement of claim 11, further comprising at least one stabilizer bar selectively attachable to the boom and the replacement thumb to prevent the replacement thumb from rotating relative to the boom.

14. The shearing implement of claim 11 further comprising a blade guide having spaced apart blade guide walls extending outward from the blade receiving surface and being configured to receive at least a portion of the distal blade member therebetween when the shearing blade member is rotated into its closed position.

15. A shearing implement for use in place of a grasping thumb of an excavator having a bucket pivotably attached to a bucket end of a boom and a first linear actuator attached at a first end to the boom and attachable at a second end to the grasping thumb and being operable to selectively rotate the grasping thumb between a non-grasping configuration and a grasping configuration in which the thumb engages a portion of the bucket, the shearing implement comprising:

a replacement thumb having
   a base with a grasping surface and a blade receiving surface on opposite sides of the base and proximal and distal base ends and
   a pair of elongate thumb wall members, each thumb wall member being attached to the base and extending proximally from the proximal base end, the thumb wall members having proximal wall end portions attachable to the boom so as to be pivotable relative to the boom at a thumb pivot at or adjacent the bucket end;

a shearing blade member having
   a proximal attachment portion with a proximal blade member end and
   a distal blade portion with a distal blade member end, the shearing blade member being pivotably attached to the replacement thumb by a blade pivot that is spaced apart from both the proximal and distal blade member ends and both the proximal wall end and the distal base end, the blade portion having a cutting edge distal to the blade pivot, the shearing blade member being configured to pivot between a closed position in which the cutting edge engages the blade receiving surface of the thumb base and an open position in which the cutting edge is rotationally spaced apart from the blade receiving surface of the thumb base; and a second linear actuator having a first end pivotably attached to the replacement thumb and a second end pivotably attached to the proximal attachment portion of the shearing blade member so that extension and retraction of the second linear actuator causes the shearing blade member to rotate about the blade pivot, wherein the second end of the first linear actuator is pivotably attachable to the replacement thumb so that extension and retraction of the first linear actuator causes rotation of the replacement thumb about the thumb pivot point.

16. A method for using a shearing implement with an excavator having a bucket pivotably attached to a bucket end of a boom, the method comprising:

providing a shearing implement having
   a thumb having
      a base with a grasping surface and a blade receiving surface on opposite sides of the base and
      a pair of elongate thumb wall members extending proximally from the base to proximal thumb wall ends,
   a shearing blade member pivotably attached to the thumb and having a blade portion with a cutting edge, the shearing blade member being configured to pivot between a closed blade position in which the cutting edge engages the blade receiving surface of the thumb base and an open blade position in which the cutting edge is rotationally spaced apart from the blade receiving surface of the thumb base, the shearing blade member being lockable in the closed position,
   and a linear actuator having a first end attached to the shearing blade member and a second end;

pivotably attaching the proximal thumb wall ends to the boom at a first attachment location selected so that the thumb can be rotated between a closed thumb position in which the grasping surface of the thumb engages a grasping portion of the bucket and an open thumb position in which the grasping surface is rotationally spaced apart from the grasping portion of the bucket;

attaching the second end of the actuator to the boom at a second attachment point spaced apart from the first attachment point;

placing the shearing implement in a grasping configuration by locking the shearing blade member in the closed blade position; and placing the shearing implement in a shearing configuration by
  unlocking the shearing blade member and
  attaching a first end of a stabilizer bar to the thumb and a second end of the stabilizer bar to the boom at a third attachment point intermediate the first and second attachment points.

17. The method of claim 16 further comprising:
while the shearing implement is in the grasping configuration,
  using the linear actuator to rotate the thumb toward the open thumb position;
  positioning at least a portion of an object between the thumb and the bucket;
  using the linear actuator to rotate the thumb toward the closed thumb position so that the grasping surface of the thumb engages the at least a portion of the object so as to grasp the at least a portion of the object between the thumb and the bucket; and
  using the linear actuator to rotate the thumb back toward the open thumb position so as to release the at least a portion of the object from between the thumb and the bucket.

18. The method of claim 16 further comprising:
while the shearing implement is in the shearing configuration,
  using the linear actuator to rotate the shearing blade member toward the open position;
  positioning at least a portion of an object between the shearing blade member and the blade receiving surface of the thumb;
  using the linear actuator to rotate the shearing blade member back toward the closed position, so that the cutting edge of the shearing blade member engages the at least a portion of the object; and
  continuing to rotate the shearing blade member toward the closed position so as to shear the at least a portion of the object with the cutting edge of the shearing blade member and the blade receiving surface of the thumb.

19. The method of claim 16, wherein the action of locking the shearing blade member in the closed blade position comprises:
  inserting a pin through holes in the thumb wall members and the shearing blade member.

* * * * *